United States Patent Office 3,055,871
Patented Sept. 25, 1962

3,055,871
POLYFORMAL-DIISOCYANATE CONDENSATION PREPOLYMERS
Milton S. Heffler, High Point, N.C., and Christopher L. Wilson, Sloatsburg, N.Y. (207 Shadow Valley, High Point, N.C.)
No Drawing. Filed Jan. 9, 1959, Ser. No. 785,778
12 Claims. (Cl. 260—77.5)

This invention relates to prepolymers, and more particularly concerns prepolymers derived from polyformal-diisocyanate condensation products.

Prepolymers made by the condensation of diisocyanates and certain polyhydroxy compounds are known in the art; such prepolymers being large molecules having terminal isocyanate groups. Upon reacting these prepolymers with water or other polyfunctional compounds, resultant reaction products may be cured to form resins, adhesives, elastomers, coatings, films and foamed products. The basic polyhydroxy compounds employed include polyesters such as the condensation product of adipic acid, diethylene glycol and trimethylolpropane and having a molecular weight of between 750 and 3000; polyether glycols such as polypropylene ether glycol having a molecular weight of between about 450 and 4000; polyether glycols such as the condensation product of glycerol and propylene oxide and having a molecular weight of about 700 to 3000; and compounds such as castor oil, which are not considered as polymeric in the present sense.

Particular interest attaches to end products which are flexible and resilient. For such products, the basic polyhydroxy unit should have a molecular weight of above 500 if it is linear, and above 1000 if it is trifunctional. In general, the basic polyhydroxy unit is polymeric and is produced by a separate condensation reaction; the exception being castor oil which is rather limited in use.

However, a selected group of polyhydroxy compounds, i.e., the polyformals, have in accordance with the instant invention, been used successfully in the manufacture of diisocyanate condensation products or prepolymers. Such polyformals are made by the condensation of formaldehyde and low molecular weight polyhydroxy compounds; and having in general a molecular weight of less than 425. The formaldehyde introduces a new type of linkage, O—$CH_2$O— into the molecular chains and enlargement can be carried out to any desired degree by linking the polyhydroxy compounds together through this newly introduced —O—$CH_2$—O— link.

Since only polyhydroxy compounds are condensed with the formaldehyde, all the chains and branches are terminated with hydroxyl groups. This is essential for the subsequent diisocyanate reaction. Unlike the carboxyl, urethane and amide groups, the formal group O—$CH_2$O— does not introduce pronounced van der Waals forces between the chains, and it is easier to obtain and maintain flexibility and resilience in the ultimate end product. Also, the formal group appears to be more resistant to autooxidation than the ether linkage in polyethylene and polypropylene ether glycols. Furthermore, the formal product is resistant to alkali saponification whereas the polyesters do not have such resistance. While the formal product is sensitive to acidic hydrolysis, yet it is less hygroscopic than the polyethylene ether linkage.

Polyformals per se are generally known in the art and since the end products having flexibility and resilience are of primary interest, such polyformals are made by the condensation of formaldehyde in monomeric, polymeric (paraformaldehyde, trioxane) or derivative from (formal of an aliphatic alcohol); and an aliphatic polyhydroxy compound. The polyhydroxy compound reacted with the formaldehyde may be either a glycol, a triol, a higher polyhydric alcohol, or an admixture thereof. The manufacture of the polyformal product may be accomplished by any one of several procedures, such as:

(1) Glycols are heated with dibutyl formal and a catalyst such as camphor sulfonic acid, at about 150° C. to give a linear polyformal of the selected glycol, having a molecular weight of 2 to 3000. This method is generally applicable to aliphatic polyhydroxy compounds or mixtures thereof, providing the hydroxyl groups in the starting compounds are separated by 4 or more atoms. The resultant products are waxy solids having a melting point of between 30 and 80° C. except for the polyformal derived from triethylene glycol, which is a viscous liquid.

(2) Monomeric cyclic formals in the presence of a small amount of an acid catalyst such as hydrogen chloride or bromide; boron trifluoride; ferric or stannic chloride; and a small but stoichiometric amount of water, glycol, triol or tetrol, will polymerize in a few hours at room temperature to give a linear or a branched polyformal with only terminal hydroxyl groups.

The cyclic formals may be derived from diethylene glycol, as trioxocane; from pentamethylene glycol as 1,3-dioxocane; from butane-1,4-diol as 1,3-dioxepane, see Ind. Eng. Chem., 46, 787 (1954), and Patent 2,031,619. The product resulting from the reaction of 1,3,6-trioxocane (20 mol), and trimethylolpropane (1 mol) in the presence of 0.01% boron trifluoride in 20 hours is a viscous liquid having a molecular weight of 2700 and a hydroxyl number of 70. The product from trioxocane (30 mol) and water (1 mol) is a waxy solid, M.P. 85 to 97° C. with a molecular weight of 3400. The molecular weight of the final polyformal is inversely related to the amount of water used in the reaction.

(3) Glycols and triols may be reacted with formaldehyde in the presence of an acid catalyst such as phosphoric, hydrochloric or sulfuric acid, an ion exchange resin of the sulfonated styrene type, to a temperature of not more than 130° C. and the water is removed steadily as an azeotrope or under reduced pressure, to give a polyformal as a viscous liquid or waxy solid with a molecular weight of between 400 and 4500, see Patent 2,786,081. As in method (1), above, the instant procedure is optimum when the starting polyhydroxy compound has its hydroxyl groups separated from one another by at least 4 atoms.

Thus, by the foregoing procedures, it is possible to provide polyformals of any desired molecular weight up to about 4500 and with any desired degree of branching. In general, to insure optimum properties in the finished polyurethane product made in accordance with the instant invention, the molecular weight of the initial polyhydroxy reactant should be from about 62 to not more than 425 so that the number of formal linkages in the finished product shall be appreciable. The molecular weight of the polyformal should be between 750 and 4500, and preferably between 1400 and 3400.

Preference is given to polyhydroxy reactants having a molecular weight below 180; but in any event, the ratio of formaldehyde units to hydroxy groups in the polyformal should be between 3:4 and 1:1. The polyformals are water insoluble except those derived from polyethylene glycols. The linear forms are usually waxy and solid, but of low melting point (below 100° C.); while those which are branched or have substituents in the polyhydroxy portion of the chain, are usually viscous, light colored liquids.

Substituents which may be present in the carbon portions of the starting polyhydroxy compounds, comprise alkyl, alkenyl, alkoxyl and cycloalkyl groups. Glycols used include ethylene and polyethylene ether, propylene and polypropylene ether and their block copolymer glycols; polymethylene glycols; polytrimethylene ether, polytetramethylene ether, and poly-1,3-butylene ether glycols; 1,4 - butenediol, 1,4 - butynediol, 2,4 - hexadiene - 1,6-diol, hexadiyne-1,6-diol, 3-hexyne-2,5-diol, 4-octyne-3,6-diol, and the alkyl substituted and ethylene and propylene oxide condensation products from these diols; 3-vinylpentane-1,5-diol, 2-(methoxyethyl)pentane-1,5-diol, 2,2,4-trimethylpentane-1,5-diol, 2- and 3-methylpentane-1,5-diols, 2-methoxyhexane-1,6-diol and thiodiglycol.

Polyfunctionality in the polyformal of above two may be introduced by the use of triols and tetrols along with the glycols listed above. Suitable triols and tetrols are: 1,5,9 - trihydroxynonane, bis(2,6 - dihydroxyhexyl) ether, 1,3,5 - trihydroxycyclohexane, 5(2 - hydroxyethoxy) - 4-hydroxymethyl - 2,4 - dimethylpentan - 1 - ol; the following and their low molecular weight ethylene and propylene oxide condensation products and their cyclic formal derivatives: glycerol, trimethylolethane, trimethylolpropane, 1,2,6-hexanetriol, pentaerythritol, dipentaerythritol. In general methods (1) and (3) described above, proceed best when the hydroxyl groups in all the components are separated from one another by not less than four atoms. Method (2) is not so limited.

The polyformals have only terminal hydroxyl groups and are best defined by their hydroxyl number which is the number of milligrams of potassium hydroxide equivalent to the hydroxyl groups in one gram of material. The prepolymers are best defined by their isocyanate content expressed as a percentage by weight, of free and available isocyanate group, —NCO.

The polyformals may be made from mixtures of polyhydroxy-compounds. If polyfunctionality above two is desired this may be attained either by the use of triols and tetrols in making the polyformal or it may be introduced at the next step in making the prepolymer. In this instance it may be done in one of several ways which are described later.

In accordance with the instant invention, the prepolymer is made by mixing polyformal and diisocyanate under anhydrous conditions. Since acidic catalysts have been used during the manufacture of the polyformal, these should be removed either by filtration when an acid ion exchange resin is used or by neutralization with a base. Acids in general inhibit prepolymer formation and bases accelerate the same. At room temperatures, the reaction of polyformal and diisocyanate is usually complete in a matter of under 20 hours as far as the terminal positions are concerned. At 100° C. the reaction takes less than an hour, unless the isocyanate is aliphatic and therefore quite unreactive.

It is preferable to make prepolymers at less than 150° C.; higher temperatures are undesirable, since branching and cross-linking become important at high temperatures and may be uncontrollable and lead to complete gelling of the reaction mass.

Various organic diisocyanates may be used including benzene 1,3- and 1,4; toluene 2,4- and 2,6-, metaxylylene, chlorobenzene 2,4-, naphthalene 1,5-, biphenyl 4,4'- and its 3,3'-dimethoxy-, 3,3'-dimethyl- and 3,3'-dichloro-derivatives, diphenylmethane 4,4'- and its, 3,3'-dimethylderivative, tetramethylene and hexamethylene diisocyanates.

Of special interest and use are the mixed toluene diisocyanates, diphenylmethane 4,4'-diisocyanate, because of their ready availability and high reactivity. Metaxylylene diisocyanate is of particular interest because it is also highly reactive and gives rise to non-yellowing products. The aliphatic diisocyanates also give non-yellowing products but they are usually less reactive.

Knowing the hydroxyl number of the polyformal it is then possible to calculate the exact amount of diisocyanate necessary to give any required type of prepolymer. If pure dry polyformal is mixed with pure diisocyanate, such that the ratio of hydroxyl to isocyanate groups is exactly 1:1 the resulting prepolymer will in theory attain maximum length and be terminated equally by hydroxyl and isocyanate groups. Such a molecule would be unsuitable for subsequent reactions owing to its low reactivity and inertness. The present invention is concerned with moderately large prepolymer molecules having only terminal isocyanate groups. These will in general, possess fluidity and solubility in inert organic media and be capable of subsequent reaction.

Such desirable prepolymers are obtained if the ratio of hydroxyl groups to isocyanate groups is less than 1:1, say 1:1.1. Theoretically, if the ratio is 1:2, the resulting prepolymer will not be of greater molecular complexity than the starting polyformal and all the terminal positions will be isocyanate. With ratios between these two limits of 1:1 and 1:2 the resulting prepolymer will be the result of chain enlargement to molecules containing more than one original polyformal molecule on the average. If diisocyanate is in excess of the amount required by a ratio of 1:2 the final prepolymer will contain free molecules of original diisocyanates. As more isocyanate is used, the flexibility and resilience of the finished product obtained upon further reaction of the prepolymer decreases. In the manufacture of foamed products according to the present invention, excess of diisocyanate is required since the foaming reaction itself is brought about by the reaction of isocyanate groups with water.

The stoichiometry of the reaction of a polyisocyanate with water is calculated, assuming that each water molecules is equivalent to two isocyanate groups. The reaction of one molecule of water with prepolymer will thus result in the formation of one molecule of gaseous carbon dioxide and the creation of one urea linkage. These linkages add resilience and toughness to the finished foam.

For the purposes of the present invention the maximum amount of diisocyanate which is desirable is such that the final isocyanate group content of the prepolymer shall be not more than 13.0%. If the molecular weight of the basic polyformal unit is between 1400 and 3400, the preferred range of isocyanate content is between 9.0 and 11.5%, for the making of foams. Assuming the above stoichiometry for the water reaction and assuming that the carbon dioxide formed all diffuses away and is replaced by air, it may be shown theoretically that the densities of foam attainable at different isocyanate contents is as follows: 9% NCO (0.038), 10% NCO (0.034), 11% NCO (0.031) and 12% (0.028). These figures are very nearly those obtained in practice but do not take into account the effect of the exotherm of the reaction on gas expansion. This may result in about a 20 to 30% increase in volume, if all the cells remained closed during expansion. In practice, a slight excess of water is used in making foams, usually between 5 and 20% excess; which results in some free aromatic amino-groups if aromatic diisocyanates are used. These free groups lead to discoloration of the finished products by oxidation. Color stability is increased therefore if less than the theoretical amount of water is used during the making of foam.

The production of foams from prepolymers made in accordance with the present invention requires the addition thereto of water, a tertiary base as a catalyst and a foam stabilizing agent. Suitable stabilizers for foams derived from polyformal prepolymers are ethylene oxide condensation products of fatty acids, alcohols and phenols;

and compounds such as sorbitol fatty acid esters. Certain anionic surface active materials, such as the salts of sulfosuccinic acid and sulfonated alkylbenzenes may also be used. The foam does not attain its maximum physical properties until it has been cured. This is best carried out by heating for up to 20 hours, to a temperature between 70 and 120° C.

The most convenient catalysts for making foams, films, coatings and adhesives are tertiary bases. They may be of varying basic strengths and of differing volatilities. Volatile tertiary bases are trimethylamine, triethylamine and methyl- and ethyl-morpholine, relatively involatile ones are triethylenediamine, quinuclidine, dimethylpyrazine, bis-4,4'-quinoline, dipyridyl and N,N'-tetramethyl-1,3-butane diamine. A compound such as brucine is completely non-volatile. The tertiary bases may have reactive centers that can tie them to the prepolymer; such materials including methyldiethanolamine, N,N'-bis-hydroxyethyl-piperazine, diethylethanolamine and the ethylene and propylene oxide condensation products of ammonia, ethylenediamine and hydrazine. In general residual non-volatile basic materials should be avoided since they tend to accelerate further changes in the final articles, such as oxidative yellowing and hydrolytic degradation.

For the manufacture of adhesives, elastomers, films and coatings, prepolymers of the present invention derived from a reaction ratio of OH/NCO of 1:2 to 1:3 are of especial value. This corresponds with an NCO content of between 2.4 and 10% in the prepolymer, depending on the molecular weight of polyformal. For these uses the prepolymer is reacted with small amounts of water, glycol or amine calculated to combine with less than the whole of the isocyanate groups present. In this way further chain extension results and the product still will have free isocyanate groups which can be used for cross linking by the action of heat. If water is a curing agent, it may be provided by atmospheric humidity; a process which is particularly convenient in the case of adhesives and coatings. The rate of the curing reaction rises in the series, water, alcohol, amine; and the new groups introduced into the polymer chain by their use are urethane in the case of alcohol and urea in the case of water or amine. The remaining excess of isocyanate groups can, under the influence of heat, be caused to react with urea or urethane groups, resulting in cross linkages. The branching or cross-linking reaction proceeds more readily with urea groups than with urethane groups. The curing temperatures for the former are between 80 and 110° and for the latter 100 to 140° C. These reactions may be accelerated by tertiary bases, as already described.

The curing agents which are particularly effective are polyfunctional hydroxy- and amino compounds; glycols such as butanediol; and diamines such as dichlorobenzidine, p-phenylenediamine, diaminopolysiloxane and monoethanolamine. The amount of curing agent will vary, depending on the isocyanate content of the prepolymer and the properties desired in the cured material. Usually between 30 and 70% of that calculated as equivalent to the NCO content is employed. This will leave a determined amount of isocyanate groups for final heat curing and cross linking.

Branching and cross linking may be produced in other ways than by causing free isocyanate groups in the final product to react with groups in neighboring chains. For instance, if the prepolymer itself has a functionality of greater than two, cross linking will be possible merely by reaction with the curing agent and will occur, therefore, at moderately low temperatures. This possibility is of importance in the making of foams since stability of the foaming mixture in the early stages of expansion is vitally dependent on some rapid cross linking. The use of polyformals with more than two terminal hydroxyl groups to give a branched prepolymer has already been described. Similar branching may be introduced into the prepolymer from linear polyformals in one of three other ways. These are:

(1) Before reaction with the diisocyanate, a small amount of a branched polyhydroxy-compound may be added to the polyformal. Such branched compounds include glycerol, castor oil, trimethylol-ethane and trimethylol-propane and 1,2,6-hexanetriol. Such triols and tetrols have been listed above for use in making the polyformals themselves.

(2) A linear prepolymer may be heated to between 100 and 150°, during which time branching occurs with progressive drop in isocyanate number. With a prepolymer from a linear polyformal having 10% NCO content, a drop on heating to 9.5% means that 20% of the molecules have become trifunctional and of twice the initial molecular weight.

(3) Branching in a linear prepolymer by heat may be attained more easily, if a little water or diamine is added; water being preferable.

For many uses such as foams and coatings, the viscosity of the prepolymer of the instant invention should be high. Foam stability during expansion increases as the viscosity of the expanding mass increases. In the reaction of a polyformal with diisocyanate, higher viscosity results if the reaction with diisocyanate is carried out in two stages. In the first stage a ratio of OH/NCO between 1:1 and 1:2, and preferably between 1:1.3 and 1:1.5 is used and the reaction of terminal positions carried to completion. In the second stage the rest of the diisocyanate is added which remains as free diisocyanate. This results in a product having a higher viscosity than if all the reactants had been mixed at the outset, although in both cases the total isocyanate content is the same.

Apparently in the preferred two stage method much larger molecules are formed, than in the case of the single stage process. By judiciously combining this method of increasing viscosity, with adequate branching by one of the methods already described, it is possible to get a prepolymer with ideal properties for any application.

The following examples are given to illustrate the preparation of the prepolymers and their use in making finished products.

*Preparation of Polyformal Prepolymers*

(A) One kilogram of a polyformal derived from 1,5-pentanediol, having a melting point of 25 to 45° C., a hydroxyl number of 65 and a molecular weight of 1723 was dehydrated by heating under reduced pressure at 100° C., cooled to 50° and mixed with 4,4'-diphenyl-methane diisocyanate. The mixture was heated to 110° C. for one hour and then cooled. The resulting prepolymer was a semi-solid viscous mass having a light brown orange color and an isocyanate content of 3.8%. It was soluble in acetone, cyclohexanone, toluene and xylene.

(B) Trimethylolpropane (3.5 g.) was dissolved by warming in a linear polyformal (430 g.) derived from 1,5-pentanediol (3 moles) and 2-methyl-1,5-pentanediol (1.5 moles); said polyformal having a viscosity at 23° of 11,300 centipoises, a hydroxyl number of 26 and a molecular weight of 4300. Metaxylylene diisocyanate (55 g.) was then added and the mixture heated to 100° for two hours. The product was light amber colored with a viscosity of 19,000 centipoises at 23° and an NCO content of 2.4%.

(C) One kilogram of a polyformal containing 0.10% water, made from dipropylene glycol and having a viscosity at 23° of 1200 centipoises, a hydroxyl number of 42.5 and a molecular weight of 2634, was mixed with 109 g. toluene diisocyanate (80% 2, 4- and 20% 2, 6-isomers) and heated to 130 to 135° for 2½ hours. More toluene diisocyanate (231 g.) was then added and the mixture cooled to give an orange colored liquid of viscosity 12,500 at 25° and an NCO content of 9.8%.

(D) A trifunctional polyformal (330 g.) of molecular weight 3300 and hydroxyl number 51 prepared from dipropylene glycol (54 moles) and the condensation product (1 mole) of trimethylpropane and three moles of propylene oxide; was mixed with 110 g. toulene diisocyanate (40% 2,4- and 60% 2,6-isomers). After heating to 130° for one hour, the viscosity was 4000 at 30° and the isocyanate content 9.0%.

(E) A branched polyformal (500 g.) made from diethylene glycol (4 moles) and 5(2-hydroxylethoxy)-4-hydroxylmethyl-2,4-dimethylpentanol (1 mole) and having a viscosity at 27° of 6200 and a hydroxyl number of 75, was mixed with 70 g. toluene diisocyanate (80% 2, 4- and 20% 2,6-isomers) and heated to 120° for 2½ hours. A further 152 g. of toluene diisocyanate was added and the mixture cooled to give a prepolymer of viscosity 24,000 cps. at 20° and an isocyanate content of 10.5%.

(F) A linear polyformal from diethylene glycol having a molecular weight of 1400 was mixed with one quarter of its weight of toluene diisocyanate (80% 2,4- and 20% 2,6-isomers). After standing overnight the isocyanate content was 5.0%.

(G) A polyformal derived from 1,4-butanediol (3.6 moles) and 3-methylpentane-1, 5-diol (1 mole) had a viscosity at 23° of 6000, a hydroxyl number of 145 and a molecular weight of 770. It was mixed with hexamethylene diisocyanate in the molecular ratio of 1:2 and heated to 100° for two hours. After cooling, to each 100 g. was added a mixture of castor oil (100 g.) and metaxylylene diisocyanate (58 g.) which had been previously heated to 100° for one hour.

*The Manufacture of Products from the Prepolymers*

(1) A linear polyformal from 1,6-hexanediol, having a molecular weight of 2200 and a hydroxyl number of 51, was melted with naphthalene 1, 5-diisocyanate in the molecular ratio of 1.0 to 1.3 and the fluid poured into a flat horizontal tray previously treated with a silicone release coating and baked. The tray was heated at 110° for three hours. The resulting elastomer was a very tough, resilient sheet but it contained some bubbles which had failed to escape before gelling had occurred. Such product may be used for shoe heels and shock absorption pads.

(2) Prepolymer A (50 g.) was warmed to 130° and 3,3'-dichlorobenzidine (2.5 g.) added. The fluid was poured into a mold and cured at 115° for three hours. The resulting product was tough and resilient with good resistance to acetone.

(3) Prepolymer B (1 part) was dissolved in xylene (1 part) and methyldiethanolamine (1% on total weight) added. The resulting mixture was coated on hardwood and on burnished aluminum. After curing for 24 hours the resulting film was colorless and adhered well and of moderate hardness. Its toughness increased steadily over five days. It was then baked on the aluminum by heating to 110° for two hours. The resulting film was flexible but hard and afforded good weathering and surface protection for the base to which it was applied.

(4) Prepolymer C (100 g.) was thoroughly mixed with water (2.5 g.), triethylamine (0.7 ml.), triethanolamine borate (1.4 g.) and the polyethyleneoxy-derivative of oleic acid (3 g.). Foaming took 2½ minutes to attain maximum volume. The foam was then cured by heating to 120° for four hours. It had good strength and resilience and a density of 0.035 g/ml. and was suitable for furniture cushions and the like.

(5) Prepolymer D (100 g.) was thoroughly mixed with the polyethylene oxide derivative of bisnonylphenol (2.5 g.), N-ethylmorpholine (1.5 g.) and N,N'-diethyl-2-methyl piperazine (0.4 g.) and then water (2.3 g.). After curing the foam had a very fine pore and a density of 0.038 g./ml. after crushing.

(6) Prepolymer E (100 g.) was mixed with the polyethyleneoxy-derivative of tall oil fatty acids (4.0 g.), dimethylsiloxane fluid (50 centipoises 0.04 g.) and aqueous trimethylamine (25%, 3.8 ml.). Foaming was fast and the resulting foam was coarse pored, semi-resilient and suitable for use as a washing sponge after it had been cured. The desnity was 0.30.

(7) Prepolymer F was brushed on a metal plate and transferred by gentle pressure to the two cut surface pieces of flexible polyetherpolyurethane flexible foam. Steam was blown onto each of the coated surfaces and the two united. After 30 min. the bond showed good initial strength and after 24 hours it was flexible and stronger than the foam.

(8) Prepolymer G was spread on the flat surface of a thick sheet of polyethylene. After curing in moist air for 26 hours, the resultant polyurethane was removed from the polyethylene as a tough semi-resilient colorless film which gained in strength considerably on further aging, and was suitable for packaging.

As various changes might be made in the embodiments of the instant invention disclosed herein, without departing from the spirit thereof, it is understood that all matter herein disclosed shall be deemed illustrative and not limiting except as set forth in the appended claims.

Having thus disclosed our invention, we claim as new and desire to protect by Letters Patent:

1. A prepolymer comprising the reaction product of an aliphatic polyformal and an organic diisocyanate wherein the isocyanate groups constitute from about 2.4 to about 13.0% of the prepolymer and the ratio of hydroxyl groups to isocyanate groups in the reactants is from between about 1:1.1 to about 1:3.0; said polyformal having only terminal hydroxyl groups and a molecular weight of from about 750 to about 4500 and being the open chain condensation of formaldehyde and an aliphatic polyhydroxy compound having a molecular weight of from about 62 to about 425, the ratio of formaldehyde to hydroxyl groups in said polyformal being from about 3:4 to about 1:1.

2. A prepolymer as in claim 1 wherein the ratio of hydroxyl groups to isocyanate groups in the reactants is from between about 1:1.1 to about 1:2.0.

3. A prepolymer as in claim 1 wherein the polyformal has a molecular weight of from 1400 to 3400.

4. A prepolymer as in claim 1 wherein the aliphatic polyhydroxy compound has a molecular weight of less than 180.

5. A prepolymer comprising a reaction product of a formaldehyde-aliphatic polyhydroxy condensation product having only terminal hydroxyl groups and an organic diisocyanate, wherein the ratio of hydroxyl to isocyanate groups in the prepolymer is less than 1:1 and said prepolymer terminates only in isocyanate groups.

6. A method of forming a prepolymer comprising reacting formaldehyde-aliphatic polyhydroxy condensation product having only terminal hydroxyl groups having a molecular weight of from about 750 to about 4500 with an organic diisocyanate at a temperature of from about 20 to 150° C. in proportions to provide from about 2.4 to about 13.0% isocyanate groups in the prepolymer, and a ratio of hydroxyl to isocyanate groups of from about 1:1.1 to about 1:3.0.

7. A method of forming a prepolymer comprising reacting a formaldehyde-aliphatic polyhydroxy condensation product having only terminal hydroxyl groups having a molecular weight of from about 750 to about 4500 with a first portion of an organic diisocyanate at a temperature of from about 20 to about 150° C. to provide a ratio of hydroxyl to isocyanate groups of from between about 1:1 to about 1:2, adding a second portion of the isocyanate to the reaction product, the total isocyanate group content being between about 2.4 to about 13.0% of the prepolymer.

8. A prepolymer as in claim 5 wherein said diisocyanate is metaxylylene diisocyanate.

9. A prepolymer as in claim 5 wherein said diisocyanate is a mixture of toluene 2,4- and 2,6- diisocyanates.

10. A prepolymer as in claim 5 wherein said diisocyanate is diphenylmethane 4,4' diisocyanate.

11. A prepolymer as in claim 1 wherein the isocyanate groups constitute from about 9.0 to about 11.5% of the prepolymer.

12. A prepolymer as in claim 5 wherein the ratio of hydroxyl to isocyanate groups in the reactants of the prepolymer is from about 1:2 to about 1:3.

References Cited in the file of this patent

UNITED STATES PATENTS 2,394,910   Gresham _____ Feb. 12, 1946

FOREIGN PATENTS 773,991   Great Britain _____ May 1, 1957